(12) United States Patent
Moser et al.

(10) Patent No.: US 12,184,127 B2
(45) Date of Patent: Dec. 31, 2024

(54) EXPANSION VALVE

(71) Applicant: Mahle International GmbH, Stuttgart (DE)

(72) Inventors: Christoph P. Moser, Liebenfels (AT); Werner Schadler, Leibnitz (AT); Mario Wetzl, Kuehnsdorf (AT)

(73) Assignee: Mahle International GmbH (DE)

( * ) Notice: Subject to any disclaimer, the term of this patent is extended or adjusted under 35 U.S.C. 154(b) by 70 days.

(21) Appl. No.: 17/607,862

(22) PCT Filed: Apr. 29, 2020

(86) PCT No.: PCT/EP2020/061842
§ 371 (c)(1),
(2) Date: Oct. 29, 2021

(87) PCT Pub. No.: WO2020/221784
PCT Pub. Date: Nov. 5, 2020

(65) Prior Publication Data
US 2022/0214090 A1    Jul. 7, 2022

(30) Foreign Application Priority Data

Apr. 30, 2019    (DE) .................. 102019206197.4

(51) Int. Cl.
*H02K 11/215*    (2016.01)
*F16K 31/04*    (2006.01)
(Continued)

(52) U.S. Cl.
CPC .......... *H02K 11/215* (2016.01); *F16K 31/046* (2013.01); *F16K 37/0041* (2013.01);
(Continued)

(58) Field of Classification Search
CPC ............... H02K 11/215; F25B 41/35; F25B 2341/0683; F25B 2600/2513; F16K 31/046; F16K 37/0041
(Continued)

(56) References Cited

U.S. PATENT DOCUMENTS

| 5,738,072 A | * | 4/1998 | Bolte | ........................ G01B 7/30 |
| | | | | 123/399 |
| 6,561,480 B1 | * | 5/2003 | Komiya | ................ F25B 41/347 |
| | | | | 251/129.05 |

(Continued)

FOREIGN PATENT DOCUMENTS

| CN | 107112832 A | 8/2017 |
| CN | 107302294 A | 10/2017 |

(Continued)

OTHER PUBLICATIONS

English abstract for JP-2003329698.
(Continued)

*Primary Examiner* — Angelisa L. Hicks
(74) *Attorney, Agent, or Firm* — Fishman Stewart PLLC

(57) ABSTRACT

An expansion valve for at least one of an air conditioning system, a battery cooler, and an oil cooler of a motor vehicle is disclosed. The expansion valve includes a housing, a sensor, a stepping motor or a brushless DC (BLDC) motor, a valve seat, and a valve body interacting with the valve seat. The stepping motor or the BLDC motor includes a rotor and a stator surrounding the rotor. The rotor includes a shaft and a permanent magnet body that is connected to the shaft in a rotationally fixed manner. The sensor is structured and arranged to detect at least one of an axial position and an angle of rotation of the permanent magnet body.

19 Claims, 2 Drawing Sheets

(51) Int. Cl.
*F16K 37/00* (2006.01)
*F25B 41/35* (2021.01)

(52) U.S. Cl.
CPC ...... *F25B 41/35* (2021.01); *F25B 2341/0683* (2013.01); *F25B 2600/2513* (2013.01)

(58) Field of Classification Search
USPC .................................................. 251/129.11
See application file for complete search history.

(56) References Cited

U.S. PATENT DOCUMENTS

| | | | | |
|---|---|---|---|---|
| 7,095,193 | B2 * | 8/2006 | Kellogg | H02K 15/00 318/400.38 |
| 7,325,780 | B2 * | 2/2008 | Arai | F16K 31/04 251/65 |
| 7,758,013 | B2 * | 7/2010 | Arai | F16K 31/53 251/85 |
| 10,088,067 | B2 * | 10/2018 | White | F16K 31/04 |
| 10,352,475 | B2 | 7/2019 | Uehara | |
| 10,594,173 | B2 | 3/2020 | Andrieux | |
| 10,707,734 | B2 | 7/2020 | Holenstein | |
| 10,935,155 | B2 | 3/2021 | Zhang | |
| 11,015,720 | B2 * | 5/2021 | Herrmann | F16K 1/52 |
| 11,585,458 | B2 | 2/2023 | Lan | |
| 2003/0056835 | A1 | 3/2003 | Gagnon | |
| 2014/0245778 | A1 * | 9/2014 | Suzuki | F25B 41/35 251/129.11 |
| 2017/0184082 | A1 * | 6/2017 | Domke | F16K 31/041 |
| 2018/0299029 | A1 * | 10/2018 | Uehara | H02K 7/06 |

FOREIGN PATENT DOCUMENTS

| | | |
|---|---|---|
| CN | 107763284 A | 3/2018 |
| CN | 108692096 A | 10/2018 |
| CN | 109555891 A | 4/2019 |
| DE | 102011116292 A1 | 4/2013 |
| EP | 2557379 A1 | 2/2013 |
| EP | 2768125 A2 | 8/2014 |
| EP | 3392538 A1 | 10/2018 |
| EP | 3502531 A1 | 6/2019 |
| JP | 07305783 A * | 11/1995 |
| JP | 2003329698 A | 11/2003 |
| WO | WO-16/092035 A1 | 6/2016 |
| WO | WO-1803025 A1 | 1/2018 |

OTHER PUBLICATIONS

German Search Report for DE-102019206197.4, mailed Apr. 20, 2020.
Chinese Second Office Action dated May 22, 2024 and Chinese Search Report dated May 19, 2024 for Chinese Patent Application No. 2020800321947.
Chinese Office Action dated Jan. 17, 2024 and Chinese Search Report dated Jan. 15, 2024 for Chinese Patent Application No. 2020800321947.

* cited by examiner

EXPANSION VALVE

CROSS-REFERENCE TO RELATED APPLICATIONS

This application claim priority to International Patent Application No. PCT/EP2020/061842 filed Apr. 29, 2020, which also claims priority to German Patent Application DE 10 2019 206 197.4 filed Apr. 30, 2019, the contents of each of which is hereby incorporated by reference in its entirety.

TECHNICAL FIELD

The present invention relates to an expansion valve for an air conditioning system of a motor vehicle. The invention moreover relates to a permanent magnet body for such an expansion valve as well as an air conditioning system of a motor vehicle comprising an expansion valve of this type.

BACKGROUND

Expansion valves, also referred to as throttle valves, are valves, which reduce the pressure of a fluid flowing through by means of a local narrowing of a flow cross section, and thus effect a volume increase or expansion, respectively. In air conditioning systems, in particular in motor vehicles, such an expansion valve reduces the pressure of a refrigerant, which usually penetrates into the expansion valve as virtually boiling liquid. It thereby experiences an isenthalpic change in state because the refrigerant relaxes when passing through the expansion valve (pressure drop of, e.g., 10 bar to 1 bar with simultaneous drop of the liquid temperature). The goal of the expansion in the valve is that the liquid reaches into the evaporator with low overheating (still liquid). The refrigerant subsequently reaches into the evaporator, in which the evaporation process of the liquid portion of the refrigerant absorbs heat from the surrounding area and thus evaporates. The fluid or air, respectively, which flows through the evaporator (heat exchanger), is cooled thereby.

However, in the case of the electric expansion valves known from the prior art, it is a disadvantage that, in order to detect a valve position, they usually have separate permanent magnets, which are arranged at a rotor of an expansion valve and which not only require an additional assembly effort, but also an additional installation space need.

The present invention thus deals with the problem of specifying an improved or at least an alternative embodiment for an electric expansion valve, which is characterized in particular by means of a compact construction.

This problem is solved according to the invention by means of the subject matter of the independent claim(s). Advantageous embodiments are subject matter of the dependent claims.

SUMMARY

The present invention is based on the general idea of integrating a permanent magnet, which determines a position of a valve body, into a permanent magnet, which effects the rotation of the valve body, and to thus attain a lower material usage as a whole, but to in particular also reduce the installation space need currently required for the position magnet. The expansion valve according to the invention, which can be used, for example, for an air conditioning system and/or also for a heat exchanger (chiller) for the battery cooling or oil cooling of a motor vehicle, has a housing, a sensor, a stepping motor or a brushless DC (BLDC) motor, a valve seat, as well as a valve body interacting therewith. The valve body is preferably formed as so-called valve needle and can be pre-tensioned into its closed position against the valve seat by means of a spring, wherein a spring of this type can in particular be used for the tolerance compensation. The stepping motor or the BLDC motor has a rotor as well as a stator surrounding said rotor, for example at least two electric coils, which surround said rotor and which are arranged spaced apart from one another in the axial direction of the rotor. An adjustment of the valve body and thus an opening or closing, respectively, of the expansion valve thereby takes place by means of a rotation of the rotor, whereupon the latter is adjusted in the axial direction together with the valve body. The rotor has a shaft as well as a permanent magnet body, which is connected thereto in a rotationally fixed manner. In response to a rotation of the shaft, an axial adjustment thereof takes place together with the valve body in the direction of the valve seat or away from the latter. An axial position and/or an angle of rotation of the permanent magnet body is/are detected via the sensor, and the opening position or the closing position, respectively, of the expansion valve are thus monitored. With the idea according to the invention, according to which the permanent magnets required for the rotation of the shaft as well as the permanent magnets required for detecting the position of the valve body and thus for detecting an opening state of the expansion valve, are integrated into the permanent magnet body, a permanent magnet body of a particularly compact construction can be attained, which does not only reduce an installation space need required for the expansion valve, but also the material usage for producing the permanent magnet body. The expansion valve according to the invention can thus be produced in a cost-efficient, resource-saving, and installation space-optimized manner.

In the case of an advantageous further development of the invention, the permanent magnet body is formed in a pot-shaped manner and has a signal generator region and a rotor region. The signal generator region thereby preferably faces the sensor, while the rotor region surrounds the shaft. Due to the fact that the rotor region of the permanent magnet body is arranged in a ring-shaped manner spaced apart around the shaft, a portion of the shaft can be arranged within the rotor region of the permanent magnet body and can thus be accommodated in a space-saving manner.

The shaft advantageously has a first longitudinal end region and a second longitudinal end region, and is arranged in a rotationally fixed manner with its first longitudinal end region in the signal generator region of the permanent magnet body, and has a blind hole-like recess at its second longitudinal end region for receiving the valve body. A particularly installation space-optimized embodiment can also be attained thereby.

The shaft and the valve body are advantageously at least partially arranged within a valve body guide, wherein the shaft has an external thread and the valve body guide has a corresponding internal thread, or vice versa, so that, in response to a rotation of the shaft, an axial adjustment of the latter takes place together with the permanent magnet body, and the valve body is thus pushed onto the valve seat or is lifted off from the latter. The sensor can thus detect an axial adjustment and/or a rotation of the permanent magnet body in this case because the latter adjusts axially together with the shaft in response to a rotation of the latter. It goes without saying that, in the alternative, it can also be provided that the shaft has an external thread and the valve body guide has a corresponding internal thread, or vice versa, wherein, in response to a rotation of the shaft, an axial adjustment of the latter takes place independently of the permanent magnet body, and the valve body is thus pushed onto the valve seat or is lifted off from the latter. The sensor thus detects only a rotation of the permanent magnet body in this case, because, in response to a rotation of the shaft, only the latter is adjusted axially in this case, but not the permanent magnet body, which remains axially in its place and thus at the same distance from the sensor.

The external thread at the shaft and the corresponding internal thread can generally be considered analogously to a threaded spindle, in the case of which a rotatory movement is converted into a translatory movement. Threaded spindles consist of a threaded rod, thus a cylindrical round bar, on which a trapezoidal, sharp, or flat thread is attached in simple applications. A sharp thread, in particular with the metric measurements M5×0.25, is thereby particularly advantageous for cost reasons.

In the case of an advantageous further development of the solution according to the invention, a split pot is provided, which surrounds the rotor and separates a rotor-side wet region from a stator-side dry region. The expansion valve according to the invention can thus be formed as so-called wet running meter, in the case of which the rotor is arranged in the refrigerant. By means of the split pot, however, the comparatively sensitive coils as well as the electronics of the control board can be kept dry reliably, whereby they are arranged in a protected manner, and the expansion valve according to the invention can thus be kept functional in the long term.

In its signal generator region, the permanent magnet body advantageously has at least one magnetic pole pair. A magnetic pole pair of this type, consisting of a north pole and a south pole, provides for a comparatively simple distance or range measurement, respectively, and/or an angle of rotation change, which can be converted directly into a degree of opening of the expansion valve, for a corresponding sensor, for example a 3D Hall sensor. A contactless and touchless distance detection can take place via a 3D Hall sensor of this type, which in particular provides the large advantage that the 3D Hall sensor can be arranged in the dry region of the expansion valve, while the rotor or the permanent magnet body, respectively, can be arranged in the wet region. Via a sensor of this type, it is possible to detect all spatial directions by means of a single sensor, which does not only offer cost advantages, but also installation space advantages. Hall sensors of this type furthermore offer the large advantage that they supply a signal even if the magnetic field, in which the respective Hall sensor is located, is constant.

According to this, an angle of rotation position or a distance of the rotor from the Hall sensor, respectively, and thus also an opening state of the expansion valve can be detected comparatively easily.

In the case of a further advantageous embodiment of the solution according to the invention, the shaft breaks through the signal generator region of the permanent magnet body. This provides the large advantage that in the case of an assembly of the expansion valve according to the invention, in the case of which the spring is initially (optionally) inserted into the blind hole-like recess at the second longitudinal end region of the shaft and the valve body is subsequently plugged in, a ring element, which limits a maximum extended position of the valve body from the blind hole-like recess, can also be pressed into the blind hole-like recess. For pressing in a ring element of this type, the shaft has to be pushed against an abutment, which is possible comparatively easily in the case of a shaft, which breaks through the permanent magnet body, because the shaft is not supported on the permanent magnet body in this case, but directly on a corresponding abutment. Significant assembly advantages of the rotor can be attained thereby.

In the case of a further advantageous embodiment of the solution according to the invention, the shaft is connected in a positive manner and/or by means of a substance-to-substance bond at its first longitudinal end region to the signal generator region of the permanent magnet body. It is conceivable thereby, for example, that the shaft has a corresponding recess or knurling, respectively, or a collar, wherein the signal generator region of the corresponding permanent magnet body has negative contours, which are formed complementary thereto. A positive connection between the permanent magnet body and the shaft, which can be additionally supported, for example, by using an adhesive, can be attained thereby. A comparatively simple positive and torque-transmitting connection between the shaft and the signal generator region of the permanent magnet can be attained by means of, for example, a non-round collar at the shaft.

The present invention is further based on the general idea of specifying a permanent magnet body for an expansion valve, which was described in the preceding paragraphs, which is formed in a pot-shaped manner and which has a signal generator region forming the pot base as well as a rotor region forming a pot wall, and which, in its rotor region, has several magnetic poles, which extend in the axial direction and which are additionally arranged so as to alternate in the circumferential direction. A permanent magnet body of this type can thereby be produced as pre-fabricated assembly or can be delivered in two pieces, wherein the two pieces can be attached comparatively easily in a positive manner to a corresponding shaft and can be connected to the latter in a positive manner. In the case of this version comprising the two half shells or in the case of the fully produced, i.e. one-piece version, of the permanent magnet body, an adhesive could additionally be used for the rotationally fixed fixation of the shaft in the signal generator region of the permanent magnet. A magnet with a particularly compact construction, which, due to its rotor region, is additionally able to receive a majority of the shaft as well as at least a portion of a needle-shaped valve body as well as of a valve body guide in its and to thus likewise arrange it in a particularly installation space-optimized manner, can be created by means of a permanent magnet body of this type according to the invention.

The present invention is further based on the general idea of specifying an air conditioning system of the motor vehicle comprising a compressor, an evaporator, a condenser, and an expansion valve described in the preceding paragraphs, in order to thus be able to transfer the advantages of the expansion valve described in the preceding paragraphs to the air conditioning system.

The invention is additionally based on the idea of using such an expansion valve in an oil cooler or a cooling system for batteries by means of heat exchanger (chiller refrigerant-cooling water circuit) and condenser in combination with the vehicle air conditioning system or also in an independent cooling circuit.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
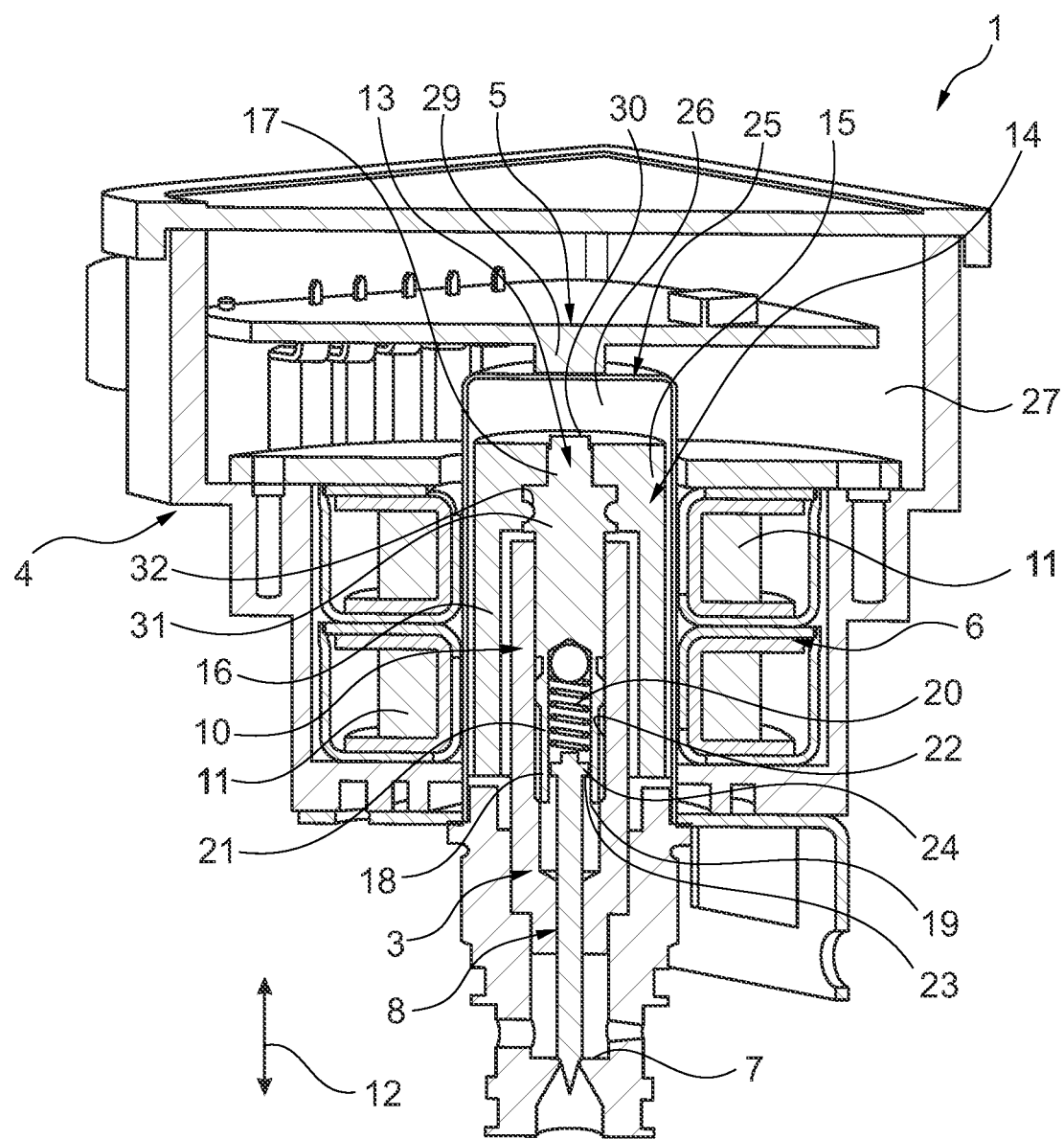
FIG. 1 shows a sectional illustration through an expansion valve according to the invention.

According to FIG. 1, an expansion valve 1 according to the invention for an air conditioning system 2 of a motor vehicle 3 (see FIG. 3) has a housing 4, a sensor 29, a control board 5, a stepping motor 6 or a BLDC motor, a valve seat 7, as well as a valve body 8 interacting therewith, and a valve body guide 9, which is firmly connected to the housing 4. The stepping motor 6 or the BLDC motor has a rotor 10 and, in this case, at least two coils 11, which surround the rotor 10 and which form the stator. Viewed in the axial direction 12, the coils 11 are thereby arranged offset or spaced apart from one another, respectively. The rotor 10, in turn, has a shaft 13 as well as a permanent magnet body 14, which is connected thereto in a rotationally fixed manner (see in particular FIG. 2) and which is preferably formed in a pot-shaped manner and can have a signal generator region 15 as well as a rotor region 16. The signal generator region 15 thereby faces the control board 5 or the sensor 29, respectively, while the rotor region 16 surrounds a majority of the shaft 13. According to the invention, the sensor 29 is formed to detect an axial position and/or an angle of rotation of the permanent magnet body 14. In the shown case, the shaft 13 is also surrounded by the permanent magnet body 14 by the latter in the region of the signal generator region 15. The shaft 13 has a first longitudinal end region 17 as well as a second longitudinal end region 18 (see also FIG. 2) and is integrated firmly, in particular in a rotationally fixed manner, with its first longitudinal end region 17 into the signal generator region 15 of the permanent magnet body 14, and additionally has a blind hole-like recess 19 at its second longitudinal end region 18 for receiving the valve body 8 as well as a spring 20, which pre-tensions said valve body in the direction against the valve seat 7.

As can thereby be gathered in particular from FIG. 1, the shaft 13 and the valve body 8 are at least partially arranged within the valve body guide 9, which, in turn, is firmly connected to the housing 4, in particular for example by means of a pressing or an adhesion.

For adjusting the valve body 8 in the axial direction 12 and thus for an opening or closing, respectively, of the expansion valve 1 according to the invention, a rotation of the rotor 10 takes place, wherein the axial adjustment can preferably be effected by means of a thread, which is arranged between the shaft 13 and the valve guide 9. For this purpose, the shaft 13 has an external thread 21, while the valve body guide 9 has a corresponding internal thread 22, which interacts with the external thread 21, so that, in response to a rotation of the shaft 13, an axial adjustment of the latter takes place together with the permanent magnet body 14, and the valve body 8 is thus pushed onto the valve seat 7 or is lifted off from the latter. A rotation of the rotor 10 is thereby effected by means of the corresponding supply of current to the stator or the coils 11, respectively. If the rotor 10 is thus rotated, it is adjusted downwards, for example in the axial direction 12 according to FIG. 1, whereupon the spring 20, which is arranged in the blind hole-like recess 19, is pushed and is thus tensioned, and pre-tensions the valve body 8 against the housing-side valve seat 7. If an opposite rotation of the rotor 10 takes place by means of a corresponding supply of current to the coils 11, said rotor is adjusted upwards in the axial direction 12, whereby the spring 20 relaxes, and the contact pressure of the valve body 8 on the valve seat 7 is initially reduced, until the valve body 8 abuts with its collar 24 against a ring element 23, which is pressed into the blind hole-like recess 19. The maximum extended state of the valve body 8 out of the blind hole-like recess 19 is attained in this state, so that a lift-off of the valve body 8 from the valve seat 7 takes place in response to a further adjustment of the rotor 10 to the top.

In response to a rotation of the shaft 13, an axial adjustment of the latter can then take place together with the permanent magnet body 14 or separately therefrom, and the valve body 8 can thus be pushed onto the valve seat 7 or can be lifted off from the latter.

The ring element 23 can thereby be pressed into the blind hole-like recess 19, wherein a radial distance to the valve body 8 remains at all times, so that the latter is arranged in a touchless manner to the ring element 23. The shaft 13 can generally be slidingly mounted in the valve body guide 9 in an upper region, that is, in the region above the spring 20.

When further looking at FIG. 1, it can be seen that a split pot 25, which surrounds the rotor 10, is provided, which separates a rotor-side wet region 26 from a coil-side/stator-side dry region 27. The control board 5 as well as the stator or the coils 11, respectively, is thus arranged in the dry region 27 and thus in a protected manner.

When looking at the permanent magnet body 14 according to the invention in more detail (see in particular FIG. 2), it can be seen that the latter has, in its rotor region 16, several magnetic poles 28 (north-south), which are radially spaced apart from the shaft 13 and which extend in the axial direction 12, and which are additionally arranged so as to alternate in the circumferential direction. In its signal generator region 15, the permanent magnet body 14 has at least one magnetic pole pair, which, according to FIG. 2, consists of a semi-circular north pole and a semi-circular south pole. A sensor 29, in particular a 3D Hall sensor (see FIG. 1), which faces the shaft 13 and which can detect a distance between a first longitudinal end 30 of the shaft 13 and the 3D Hall sensor, and thus an opening state of the expansion valve 1, is additionally arranged at the control board 5.

Figure 2:
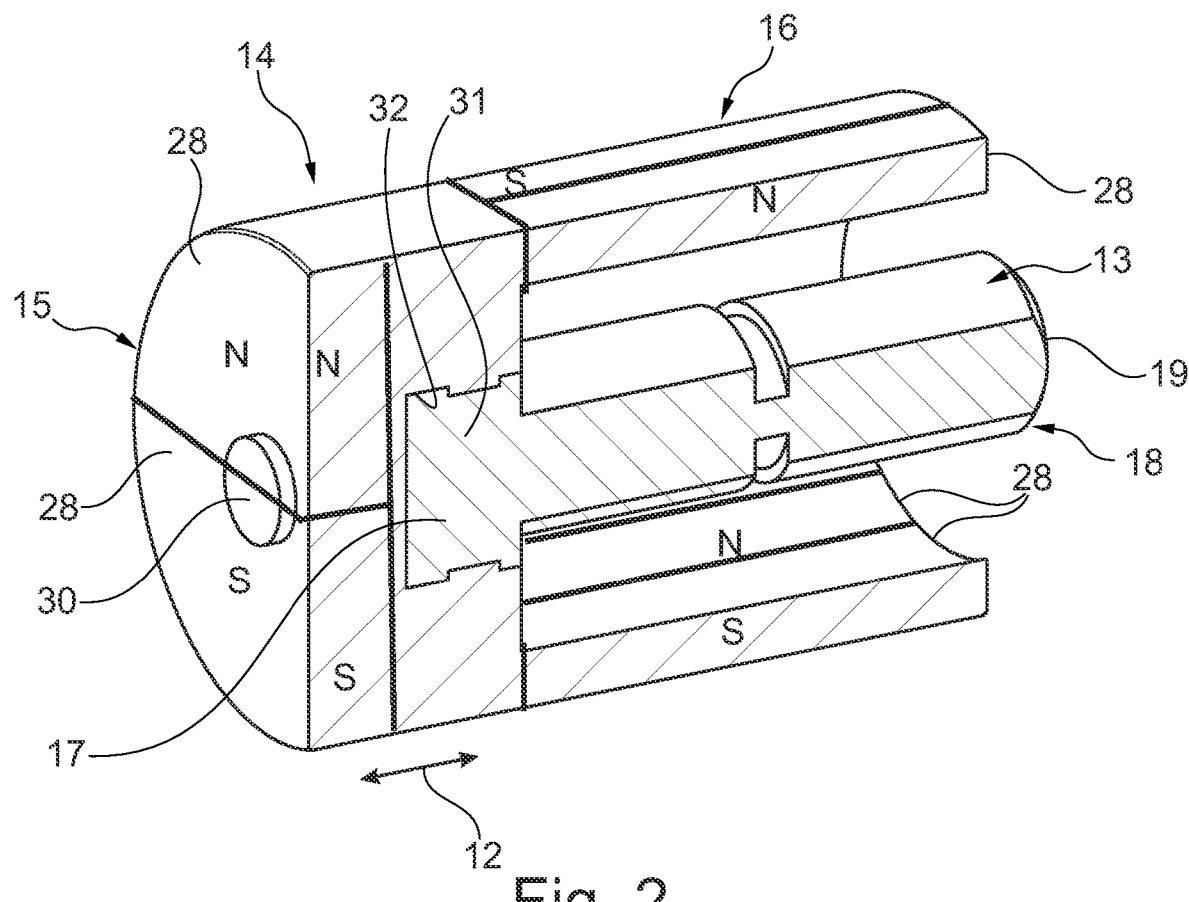
FIG. 2 shows a detailed sectional illustration through a permanent magnet body according to the invention.

As can be gathered from FIGS. 1 and 2 thereby, the shaft 13 of the rotor 10 breaks through the signal generator region 15 of the permanent magnet body 14, which further provides the large advantage that, in response to a press-in of the ring element 23 into the blind hole-like recess 19 at the second longitudinal end region 18 of the shaft 13, after the insertion of the spring 20 and of the valve body 8, a support does not take place via the permanent magnet body 14, but only via the shaft 13 itself, because the latter extends beyond the signal generator region 15 of the permanent magnet body 14 with its longitudinal end 30 according to FIGS. 1 and 2.

A connection between the permanent magnet body 14 and the shaft 13 thereby takes place via a positive connection and/or substance-to-substance bond, whereby it is conceivable that, at its first longitudinal end region 17, the shaft 13 is connected in a positive manner and/or by means of a substance-to-substance bond to the signal generator region 15 of the permanent magnet body 14. A positive connection, which furthermore allows for a torque transmission, is conceivable, for example, by means of a non-round positive connection body 31 and a negative contour 32 in the permanent magnet body 14, which is formed complementary thereto. A torque transmission can take place between the permanent magnet body 14 and the shaft 13 via a positive connection of this type, wherein an axial adjustment between them can be permitted. It goes without saying that the rotationally fixed connection between the permanent magnet body 14 and the shaft 13 can be additionally supported by means of an adhesive and thus a substance-to-substance bond. An axial relative adjustment between permanent magnet body 14 and shaft 13 would be prevented in this case. In particular in this case, the permanent magnet body 14 would be fastened to the shaft 13 in such a way that both are coupled in the axial direction of movement. It is conceivable thereby, for example, that the signal generator region 15 consists of two semi-circular magnetic poles (north-south), which are attached to the positive connection body 31 of the shaft 13 in the radial direction, and which are firmly connected to said positive connection body subsequently.

It is also conceivable that the shaft 13 is extrusion-coated directly with a plastic, in particular thermoplastic, e.g. PA 6, to which magnetizable particles (ferrum, neodymium . . . ) are added, and the permanent magnet body 14 is thus produced. In contrast to sintered alternatives, this provides the advantage of a high strength and bond to the shaft 13.

Due to the integration of the signal generator region 15 as well as of the rotor region 16 in a one-piece permanent magnet body 14, a functional integration can be created, so that the rotor region 16 required for rotating the rotor 10 and thus for opening or closing, respectively, the expansion valve 1, and the signal generator region 15 required for detecting an opening state or closing state, respectively, of the expansion valve 1, can be integrated into a single, common permanent magnet body 14, whereby the latter is of a more compact construction.

It is generally also conceivable that the signal generator region 15 and/or the permanent magnet body 14 have/has a constant distance from the sensor 29. An adjustment of the expansion valve 1 thus takes place exclusively by means of a rotation of the permanent magnet body 14 in this case. The shaft 13 can thereby be supported in an axially movable manner in the permanent magnet body 14.

Figure 3:
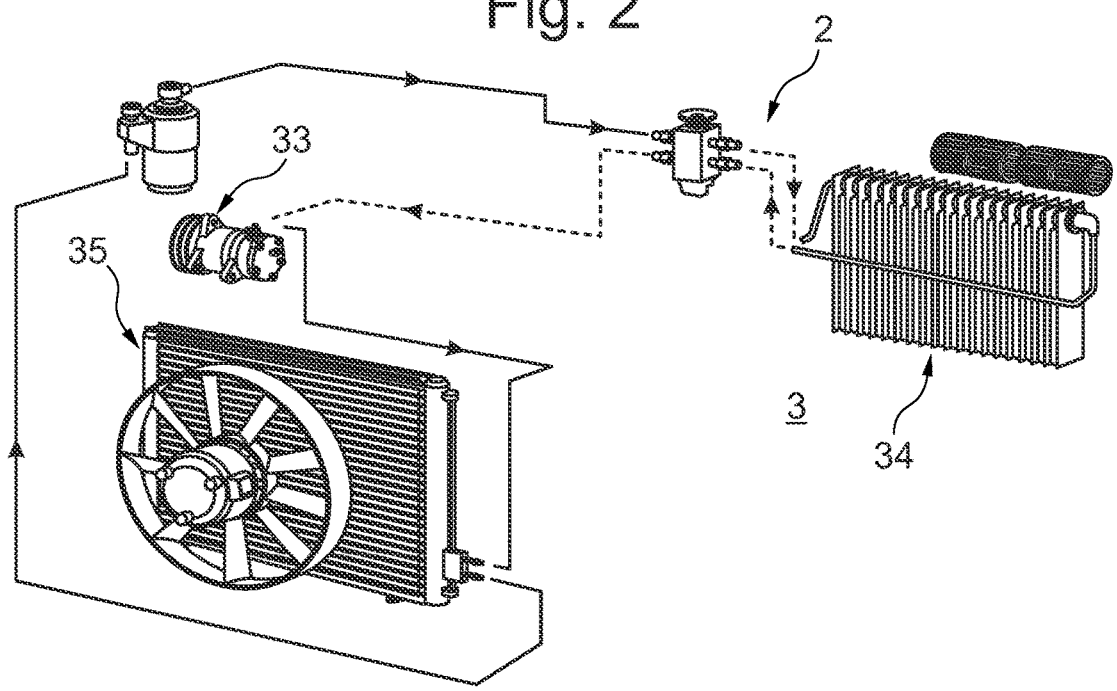
FIG. 3 shows an air conditioning system comprising an expansion valve according to the invention.

The expansion valve 1 according to the invention, together with the permanent magnet body 14 according to the invention can be used, for example, in an air conditioning system 2 of a motor vehicle 3, as it is illustrated according to FIG. 3, wherein an air conditioning system 2 of this type additionally comprises a compressor 33, an evaporator 34, as well as a condenser 35.

A cost-efficient, functionally integrated, and additionally installation space-optimized expansion valve 1 can thus be created by means of the expansion valve 1 according to the invention.

The invention claimed is:

1. An expansion valve for at least one of an air conditioning system, a battery cooler or an oil cooler of a motor vehicle, comprising:
a housing, a sensor, a stepping motor or a brushless DC (BLDC) motor, a valve seat, and a valve body interacting with the valve seat,
the stepping motor or the BLDC motor including a rotor and a stator surrounding the rotor,
the rotor including a shaft and a permanent magnet body that is connected to the shaft in a rotationally fixed manner,
wherein the sensor is structured and arranged to detect an axial position of the permanent magnet body and/or an angle of rotation of the permanent magnet body;
wherein the permanent magnet body has a pot-shaped structure including a signal generator region and a rotor region, the signal generator region extending radially inwards from the rotor region;
wherein the shaft is directly connected to the signal generator region of the permanent magnet body via a positive connection and/or a bonded connection; and
wherein the sensor is arranged at a control board, and/or a split pot is provided, which surrounds the rotor and separates a rotor-side wet region from a stator-side dry region.

2. The expansion valve according to claim 1, wherein the rotor region extends axially from a bottom end of the signal generator region.

3. The expansion valve according to claim 2, wherein the signal generator region faces the sensor, and the rotor region surrounds the shaft.

4. The expansion valve according to claim 1, wherein the shaft has a first longitudinal end region and a second longitudinal end region, and is arranged in a rotationally fixed manner with the first longitudinal end region in the signal generator region of the permanent magnet body, and has a blind hole recess at the second longitudinal end region for receiving the valve body.

5. The expansion valve according to claim 1, wherein:
the shaft and the valve body are at least partially arranged within a valve body guide, and
the shaft has an external thread and the valve body guide has a corresponding internal thread, or vice versa, so that, in response to a rotation of the shaft, an axial adjustment of the shaft takes place together with the permanent magnet body, and the valve body is pushed onto the valve seat or is lifted off from the valve seat.

6. The expansion valve according to claim 1, wherein the shaft has an external thread and the valve body guide has a corresponding internal thread, or vice versa, so that, in response to a rotation of the shaft, an axial adjustment of the shaft takes place independently of the permanent magnet body, and the valve body is pushed onto the valve seat or is lifted off from the valve seat.

7. The expansion valve according to claim 1, wherein the signal generator region and/or the permanent magnet body has a constant distance from the sensor.

8. The expansion valve according to claim 1, wherein the shaft is supported in an axially movable manner in the permanent magnet body.

9. The expansion valve according to claim 1, wherein the permanent magnet body is secured to the shaft such that both are coupled in the axial direction of movement.

10. The expansion valve according to claim 1, wherein:
the sensor is a 3D Hall sensor, and/or
the control board is arranged in the stator-side dry region.

11. The expansion valve according to claim 1, wherein in the rotor region, the permanent magnet body has several magnetic poles that are radially spaced apart from the shaft, extend in the axial direction and are arranged so as to alternate in a circumferential direction.

12. The expansion valve according to claim 1, wherein in the signal generator region, the permanent magnet body has at least one magnetic pole pair.

13. The expansion valve according to claim 1, wherein the shaft breaks through the signal generator region of the permanent magnet body.

14. An air conditioning system of a motor vehicle, comprising:
a compressor, an evaporator, a condenser, and expansion valve as claimed according to claim 1.

15. The air conditioning system according to claim 14, wherein the permanent magnet body is structured in a pot-shaped manner and has a signal generator region and a rotor region, the signal generator region extending radially inwards from the rotor region, and the rotor region extending axially from a bottom end of the signal generator region.

16. The air conditioning system according to claim 14, wherein the shaft is directly connected to the signal generator region of the permanent magnet body via a positive connection and/or a substance-to-substance bonded connection.

17. The expansion valve according to claim 1, wherein the shaft has a first longitudinal end that is connected to the signal generator region via a positive connection, the positive connection comprising a non-round positive connection body provided by the shaft and a negative contour in the permanent magnet body.

18. An expansion valve for at least one of an air conditioning system, a battery cooler or an oil cooler of a motor vehicle, comprising:
a housing, a sensor, a stepping motor or a brushless DC (BLDC) motor, a valve seat, and a valve body interacting with the valve seat,
the stepping motor or the BLDC motor including a rotor and a stator surrounding the rotor,
the rotor including a shaft and a permanent magnet body that is connected to the shaft in a rotationally fixed manner,
wherein the sensor is structured and arranged to detect an axial position of the permanent magnet body and/or an angle of rotation of the permanent magnet body;
wherein the permanent magnet body has a pot-shaped structure including a signal generator region and a rotor region, the signal generator region extending radially inwards from the rotor region;
wherein the shaft is directly connected to the signal generator region of the permanent magnet body via a positive connection and/or a bonded connection;
wherein the shaft and the valve body are at least partially arranged within a valve body guide; and
wherein the shaft has an external thread and the valve body guide has a corresponding internal thread, or vice versa, so that, in response to a rotation of the shaft, an axial adjustment of the shaft takes place together with the permanent magnet body, and the valve body is pushed onto the valve seat or is lifted off from the valve seat.

19. An expansion valve for at least one of an air conditioning system, a battery cooler or an oil cooler of a motor vehicle, comprising:
a housing, a sensor, a stepping motor or a brushless DC (BLDC) motor, a valve seat, and a valve body interacting with the valve seat,
the stepping motor or the BLDC motor including a rotor and a stator surrounding the rotor,
the rotor including a shaft and a permanent magnet body that is connected to the shaft in a rotationally fixed manner,
wherein the sensor is structured and arranged to detect an axial position of the permanent magnet body and/or an angle of rotation of the permanent magnet body;
wherein the permanent magnet body has a pot-shaped structure including a signal generator region and a rotor region, the signal generator region extending radially inwards from the rotor region;
wherein the shaft is directly connected to the signal generator region of the permanent magnet body via a positive connection and/or a bonded connection; and
wherein the shaft has an external thread and the valve body guide has a corresponding internal thread, or vice versa, so that, in response to a rotation of the shaft, an axial adjustment of the shaft takes place independently of the permanent magnet body, and the valve body is pushed onto the valve seat or is lifted off from the valve seat.

* * * * *